United States Patent [19]

Garaschenko et al.

[11] Patent Number: 5,089,128
[45] Date of Patent: Feb. 18, 1992

[54] APPARATUS FOR SEPARATION OF FERROMAGNETIC MATERIALS FROM FLUID MEDIA

[75] Inventors: Vyacheslav I. Garaschenko; Alexandr V. Sandulyak; Igor V. Volkov, all of Rovno, U.S.S.R.

[73] Assignee: Ukrainsky Institute Inzhenerov Vodnogo Khozyaista, Rovno, U.S.S.R.

[21] Appl. No.: 460,907

[22] PCT Filed: May 25, 1988

[86] PCT No.: PCT/SU88/00121
§ 371 Date: Feb. 8, 1990
§ 102(e) Date: Feb. 8, 1990

[87] PCT Pub. No.: WO89/11324
PCT Pub. Date: Nov. 30, 1989

[51] Int. Cl.[5] .................................................. B01D 35/06
[52] U.S. Cl. ......................................... 210/222; 210/236; 210/351; 210/489; 210/497.01; 210/497.1; 210/498; 55/100
[58] Field of Search .............. 210/222, 223, 351, 388, 210/489, 498, 336, 335, 497.01, 497.1; 209/223.2, 224, 232, 228; 55/100

[56] References Cited

U.S. PATENT DOCUMENTS

| | | | |
|---|---|---|---|
| 4,190,524 | 2/1980 | Watson | 210/222 |
| 4,363,729 | 12/1982 | Yano | 210/222 |
| 4,816,143 | 3/1989 | Vollmar | 210/222 |

FOREIGN PATENT DOCUMENTS

| | | | |
|---|---|---|---|
| 1277488 | 4/1969 | Fed. Rep. of Germany . | |
| 3316443 | 10/1984 | German Democratic Rep. | 210/222 |
| 49122 | 4/1980 | Japan | 210/222 |
| 586920 | 1/1978 | U.S.S.R. | 210/222 |
| 784894 | 12/1980 | U.S.S.R. | 210/222 |
| 1029990 | 7/1983 | U.S.S.R. | |
| 1044310 | 9/1983 | U.S.S.R. | 210/222 |
| 1047844 | 10/1983 | U.S.S.R. | 210/222 |
| 1152618 | 4/1985 | U.S.S.R. | 210/222 |
| 1263305 | 10/1986 | U.S.S.R. | 210/222 |
| 557214 | 11/1943 | United Kingdom | 210/223 |

Primary Examiner—W. Gary Jones
Assistant Examiner—Matthew O. Savage
Attorney, Agent, or Firm—Lilling & Lilling

[57] ABSTRACT

An apparatus for separation of ferromagnetic materials has a working chamber occupied by a ferromagnetic attachment in the form of plates with openings edged by shaped projections, a magnetizing system and means for consolidation of the plates made in the form of an additional magnetic field source, and inlet and outlet connections, respectively, for fluid medium. The spacing of the openings on the plate, their sizes and configuration, the sizes of the projections and the distance between the plates are selected to be variable throughout the volume of the working chamber depending on the magnetic properties and sizes (dispersity) of foreign particles in the fluid medium being purified, and viscosity of the fluid medium.

23 Claims, 9 Drawing Sheets

APPARATUS FOR SEPARATION OF FERROMAGNETIC MATERIALS FROM FLUID MEDIA

BACKGROUND OF THE INVENTION

1. Field of the Invention

The present invention relates to an apparatus for separation of ferromagnetic materials from fluid media.

2. Description of the Related Art

There is known an apparatus for separation of ferromagnetic materials from fluid media, (SU, A, 1029990). It comprises a cylindrical working chamber externally accommodating a magnetizing system and internally incorporating a ferromagnetic attachment made in the form of plates with openings. The working chamber is provided with connections for intake of the fluid medium to be purified and for discharge of the purified fluid medium.

In the known apparatus the plates with openings are equally spaced throughout the height of the working chamber, and gaps are formed between the plates for passing the flow of the fluid medium being purified. The impurities are precipitated out of the medium being purified at the edge of the openings in the plates where zones of nonuniform magnetic field are set up. However, the effect of the nonuniform magnetic field forces on the foreign particles in these zones is not substantial. Besides, all the zones of the nonuniform magnetic field have approximately one and the same nonuniformity throughout the volume of the working chamber which prevent the fluid media containing impurities with a different degree of dispersity and different magnetic properties from being effectively purified, as the removal of such impurities requires different nonuniformity of the magnetic field throughout the volume of the working chamber.

Further in the known apparatus the plates are rigidly secured to one another and have no possibility of mutual displacement and separation from one another which prevents an effective regeneration and consequently a qualitative washing of trapped impurities away from the plates.

Also known to the prior art is an apparatus for separation of ferromagnetic materials from fluid media, (SU, A, 1152618), comprising a working chamber internally accommodating a ferromagnetic attachment in the form of a multitude of plates with through openings provided along the circumference with shaped projections oriented at an angle to the plane of the plates, a magnetizing system adapted for interaction with the ferromagnetic attachment and for its magnetizing, an inlet connection for delivery of a fluid medium to be purified in the working chamber and an outlet connection for receiving the purified fluid medium after it passed through the attachment.

In the known apparatus the plates with openings of equal sizes comprise shaped projections forming a multitude of zones of the nonuniform magnetic field, the value of which, in these zones, is greater by an order of magnitude than in the plates with the openings having no projections. This apparatus is effective in purification of fluid media containing foreign particles similar in size and magnetic properties. If the medium to be purified is changed and contains foreign particles of other sizes and properties, it calls for changing the plate attachment with another one having plates with openings of other sizes and spacing, and other shaped projections.

Viscosity of a medium to be purified also exerts a substantial influence on the effectiveness of purification and on selection of the attachment. The use of plates with openings and projections of similar sizes and spacing results in that, in the apparatus engaged in purification of fluid media, portions of the attachment volume throughout the height of the working chamber take an unequal share in the purification mode. The lower portions (adjacent to the inlet connection) are clogged with impurities rapidly, the middle portions, slowly and the upper portions (adjacent to the outlet connection) are clogged still more slowly. In this case the time between the two subsequent regeneration periods will be determined by operation of the lower plate layers of the attachment, i.e. the filtration cycle will be reduced.

Also the majority of the real fluid media to be purified contain foreign particles with the sizes thereof varying in a wide range from 0.01 to 10 $\mu$m and upward, while the required degree of purification of the fluid media, for example, a circulating water in the metallurgy or condensates of thermal power stations should be brought up to a residual content of impurities within $10^{-4}$–$10^{-9}$ fraction of the total mass. Besides the impurities possess different magnetic properties: from paramagnetic to ferromagnetic, and the fluid media to be purified are varying from gases to condensates and oils which have different viscosity. Due to the design features the known apparatus cannot provide the required degree of purification of the media containing impurities of different sizes and different magnetic properties, and fails to ensure equally effective conditions of purification throughout the entire volume of the attachment.

SUMMARY OF THE INVENTION

The invention is essentially aimed at providing an apparatus for separation of ferromagnetic materials from fluid media having a ferromagnetic attachment of such a design that will ensure an effective purification of fluid media having different viscosity and containing ferromagnetic particles of different sizes and properties at a reduced energy consumption.

The invention essentially resides in an apparatus for separation of ferromagnetic materials from fluid media, comprising a working chamber internally accommodating a ferromagnetic attachment made in the form of a multitude of plates with through openings provided along the circumference with shaped projections oriented at an angle to the plane of the plates, a magnetizing system adapted for interaction with the ferromagnetic attachment and for its magnetizing, an inlet connection for delivery of a fluid medium to be purified in the working chamber and an outlet connection for receiving the purified fluid medium after it has passed through the attachment. According to the invention, the spacing of openings on a plate, their sizes and configuration, the sizes and shape of the projections, and the distance between the plates are selected to be variable throughout the volume of the working chamber depending on the magnetic properties of foreign particles in the fluid medium being purified, their sizes (dispersity), and concentration and viscosity of the fluid medium.

To change the distance between the plates to a required value, it is preferred to make the plates of a material possessing elastic properties, to form the plates into an identical curvilinear shape and place elastic liners between the plates. It is suitable that elements which are simple in manufacture and ensure, if required, a different degree of compressing the multitude of plates and also ensure the presence or absence of contact between the shaped projections and the surface of adjacent plates when the magnetic field is either switched on or off, be used as elastic liners.

For adjusting the degree of compressing (bringing together) the plates, it is desirable to have at least one additional source of the magnetic field disposed outside the apparatus working chamber so that the vector of the magnetic field ensures, when switched on or off, that the magnetic interaction with the plate attachment will be oriented along the center line of the working chamber, thereby compressing, if required, the plates to a minimum possible distance therebetween or separating the plates, i.e. increasing the distance between the plates to a required value.

To facilitate the changing of the distance between the plates, especially in the process of their separation for regeneration, it is advantageous to install them in the working chamber alternately; one convex, another concave and so forth.

When it is required to increase the number of zones of high-gradient magnetic field in order to provide, for example, the required degree of fine purification of low-concentration fluids, it is desirable to make the shaped projections in the form of pointed "petals" and to provide at least a part thereof with an additional opening edged by auxiliary pointed "petals" bent at an angle relative to the plane of the "petal", while the number of the main "petals" provided with the additional openings may suitably be increased throughout the length of the working chamber from the inlet connection towards the outlet connection. This makes it possible to operate the apparatus in the purification mode until the entire volume of the attachment is completely and uniformly clogged with impurities, and thus to extend the filtration cycle, to step up the absorption capacity and economy of the apparatus on the whole.

Each preceding plate of the ferromagnetic attachment may advantageously be connected by its rear end with the front end of each subsequent plate so that the plates form a zigzag ribbon along the center line of the working chamber.

In a number of cases the plates may be arranged in parallel with one another and the distance between two adjacent plates may be decreasing in magnitude from the inlet connection towards the outlet connection.

In this case the height of the shaped projections should be equal to the distance between two adjacent plates so that the ends of projections of the preceding plates are in contact with surfaces of the subsequent plates.

To provide a uniform precipitation of impurities of different dispersity throughout the entire height of the attachment, it is likewise desirable that the plates be made so that the size of openings in the plates is diminishing from the inlet connection towards the outlet connection.

For providing a rational and economic purification process, the shaped projections may preferably be made ring-like in form with a variable section increasing from the top of the projection towards the base thereof.

For increasing the number of zones of the high-gradient magnetic field, it is preferred to provide notches on the face surface of the ring-like projection.

It is also advantageous to make the shaped projections along the circumference of openings in the form of collars bent outwardly in relation to the center of the opening in order to increase the area for precipitation of impurities.

The height of the shaped projections may be less than the distance between two adjacent plates and the plates proper may be made with convex or concave portions disposed in the vicinity of openings and having such a depth in relation to the plate surface that in combination with the height of the shaped projection the contact thereof with the surface of an adjacent plate is ensured.

For increasing the density of the plate stack, the magnetic permeability of the whole plate stack and the magnetic forces interacting between the attachment and foreign particles of the medium being purified, the plates may preferably be provided with additional shaped projections made in the form of bars.

In this case the bars, rigidly secured in even plates, may be of a length equal to the distance between each two nearest odd plates. In other cases the bars may be of a length lesser than the distance between each two nearest odd plates.

The bars may be made in the form of a bundle of elastic ferromagnetic filaments.

The bars may also be made of variable cross-section.

In addition, the bars may be made in the form of tubes due to which the hydraulic resistance of the attachment is reduced.

When the magnetizing system is made in the form of a solenoid, it is desirable to make the plates in the form of flat disks and to have the number of shaped projections in each plate increasing from the periphery towards the disk center.

If the magnetizing system is made in the form of a two-pole electromagnet, with the poles thereof bearing against the surface of the working chamber in which the flow of the fluid medium being purified is oriented transverse to the magnetic field induction vector, it is advantageous to distribute the shaped projections on the plates so that their number in the zone of each plate arranged most distant from the electromagnet poles be increased.

The plates may be made in the form of concentric cylindrical surfaces coaxial with the working chamber and the distance between the adjacent plates should be decreasing in magnitude from the inlet connection towards the outlet connection.

The plates may also be made in the form of cylindrical surfaces which in cross-section form a spiral in which the distance between adjacent spiral turns is decreasing in magnitude from the inlet connection towards the outlet connection.

Advantages of an apparatus for separation of ferromagnetic materials from fluid media made in accordance with the present invention reside in that the selection, embodiment and spacing of openings on a plate in the ferromagnetic attachment, their sizes and configuration, the sizes and shape of projections, the distance between the plates varied throughout the volume of the working chamber depending on the magnetic properties of ferromagnetic foreign particles in the fluid medium being purified, their sizes (dispersity), concentration and viscosity of the fluid medium ensure, at low allowable consumption of energy, the required high degree of purification both of the fluid and gas media having decreased and increased viscosity, foreign particles of different sizes and different magnetic properties.

In an apparatus made according to the invention, the ferromagnetic attachment is rapidly and effectively regenerated. Due to the presence of additional magnetic field sources, density of the plate stack in the attachment is simply, from the technical standpoint, regulated by means of additional magnetic field sources disposed outside the working chamber and providing a magnetic interaction with the plate attachment.

The use of elastic curvilinear plates with elastic liners disposed therebetween cuts down the consumption of energy when the density of the plates in the stack is changed at the expense of their compression or separation (drawing apart) which ensures high-quality of the regeneration process. An especially easy variation of the density of the attachment plate stack in a wide range, for example, from 0.1 to 0.6 is ensured in an alternative embodiment in which the plates are interconnected so that they make up a zigzag ribbon along the centre line of the working chamber.

Providing the apparatus according to the invention with additional shaped projections made in the form of ferromagnetic bars arranged and secured in the odd plates makes it possible to increase the density of the attachment plate stack, the mean induction of the magnetic field in the attachment, the number of zones of the high-gradient magnetic field and the degree of purification of fluid media. The shape and sizes of the bars are selected in accordance with the kind of a fluid medium to be purified and requirements to the degree of purification.

Embodiments in which the plates are made in the form either of concentric cylindrical surfaces or in the form of cylindrical surfaces which in the cross-section form spirals are especially suitable in mounting and dismounting.

In all the embodiments according to the invention, a uniform clogging of the entire volume of the attachment with foreign particles is ensured. Along with this, the degree of purification and a time period during which the apparatus operates in the purification mode are increased due to the fact that the number of projections, their height and the distance between the plates are set up varying throughout the height and diameter of the working chamber, for example, the distance between the plates is decreasing in magnitude from the inlet connection towards the outlet connection.

BRIEF DESCRIPTION OF THE DRAWINGS

Now, in order that the invention may be clearly understood, embodiments thereof are by way of example only, without restricting the invention, hereafter more fully described with reference to the accompanying drawings, wherein.

DESCRIPTION OF THE PREFERRED EMBODIMENT

Further in the text and on drawings the like elements are designated by like reference numerals.

Figure 1:
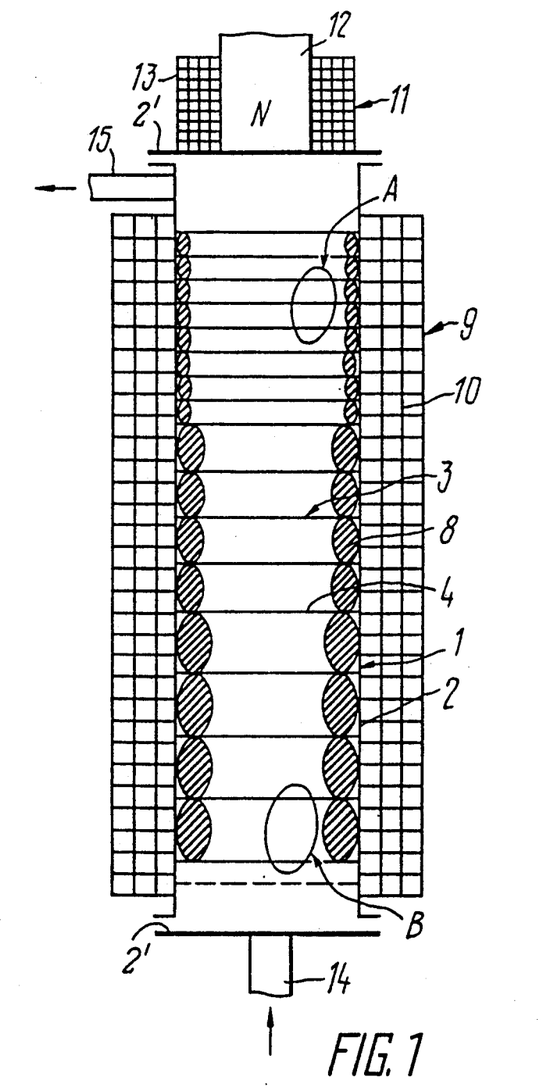
FIG. 1 is a longitudinal section of the general view of an apparatus for separation of ferromagnetic materials from fluid media, comprising a ferromagnetic attachment in the form of a multitude of flat plates.
Figure 2:
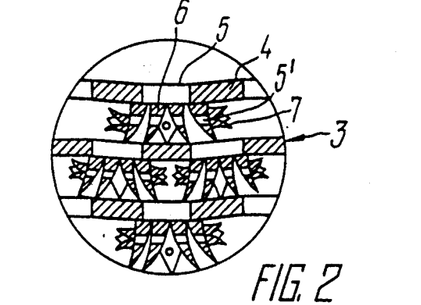
FIG. 2 is an enlarged detail A in FIG. 1 illustrating shaped projections of the plates in the form of main pointed "petals" provided with additional openings edged with auxiliary pointed "petals" bent at an angle to the plane of the "petal"
Figure 3:
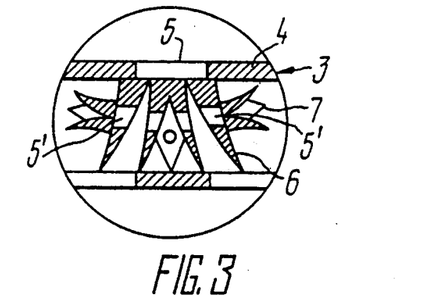
FIG. 3 is an enlarged detail B in FIG. 1 illustrating the main and auxiliary pointed "petals" in which the height and width are greater than those of FIG. 2.

A proposed apparatus for separation of ferromagnetic materials from fluid media illustrated in FIGS. 1, 2, 3 comprises one working chamber 1. The chamber 1 is formed by a cylindrical housing 2 with end covers $2^1$ and internally accommodates a ferromagnetic attachment 3 in the form of a multitude of elastic flat plates 4 having through openings 5 provided along the circumference with shaped projections 6 in the form of pointed "petals" oriented at an angle to the plane of the plates 4. In addition a part of the shaped projections 6 are provided with a through opening $5^1$ having auxiliary pointed "petals" 7. Disposed between the plates 4 are elastic liners 8 which may suitably be made of such materials as water-resistant, acid-resistant rubber and raw rubber, as well as other known elements, appliances functioning as an elastic liner.

The apparatus also comprises a magnetizing system 9 disposed outside the chamber 1 and presented in the given embodiment by a solenoid 10. For changing the distance between the plates 4 in order to adjust the density of the stack of plates of the attachment 3, the working chamber 1 is provided with an additional magnetic field source 11 disposed outside the chamber 1 on the top cover $2^1$ and ensuring the interaction of magnetic forces with the plate attachment 3. If the effect of one magnetic field source 11 on the plates 4 is not sufficient, i.e. when the required change in density of the stack of the plates 4 is not ensured, a second additional magnetic field source is installed on the lower cover $2^1$ of the chamber (not shown in the Fig.). The magnetic field source 11 is made in the form of an electromagnet comprising a ferromagnetic core 12 and an electric coil 13. The source 11 may also be made in the form of a solenoid if the diameter of the housing 2 is of a substantial size, for example 0.5 m and upward. In this case the additional magnetic field source 11 may suitably be arranged on the side surface of the housing 2 concentric therewith and similarly to the solenoid 10. To deliver a fluid medium to be purified in the working chamber 1, and to discharge the purified fluid medium therefrom, the chamber is provided with inlet and outlet connections 14 and 15, respectively.

Referring to FIGS. 1, 2, 3 the plates 4 are made in the form of flat disks arranged in parallel with one another and the distance therebetween is decreasing in magnitude from the inlet connection 14 towards the outlet connection 15. The number of the main shaped projections 6 and the auxiliary "petals" 7, their height and sizes of the openings 5 and $5^1$ are also varying from the inlet connection 14 towards the outlet connection 15. Such a design feature ensures a uniform clogging of the entire volume of the attachment 3 with foreign particles, thereby extending the time of the effective purification mode up to the next regeneration. The distance between the plates 4 is changed by means of the elastic liners 8 which, while being compressed or expanded under the action of forces of plates magnetized by the additional magnetic field source 11 and the solenoid 10, ensure the required density of the stack of plates of the attachment 3 and control the presence or absence of contacts between the projections 6 and the surface of the plates 4.

The mean value of the magnetic field induction in the attachment 3 and the number of zones of the non-uniform magnetic field is increasing when the height of the shaped projections 6 is decreased and the spacing of the openings 5 and $5^1$ is reduced, i.e. when the number of the openings 5 and $5^1$ per unit area of the plate 4 is increasing in the direction of flow of the medium being purified, as it is shown in FIGS. 2, 3. With the same mass of metal of the plates 4 per unit volume, i.e. with the unchanged density of the stack of the plates 4 throughout the entire volume of the attachment 3, the action of the magnetic field forces on the foreign particles is enhanced at the expense of providing the main pointed "petals" of the shaped projections 6 with additional openings $5^1$ edged by the auxiliary pointed "petals" 7 bent at an angle to the plane of the main "petal", the number of the main projections 6 provided with the additional openings $5^1$ being increased throughout the length of the chamber 1 from the inlet connection 14 towards the outlet connection 15, as is shown in FIGS. 1, 2, 3.

Figure 4:
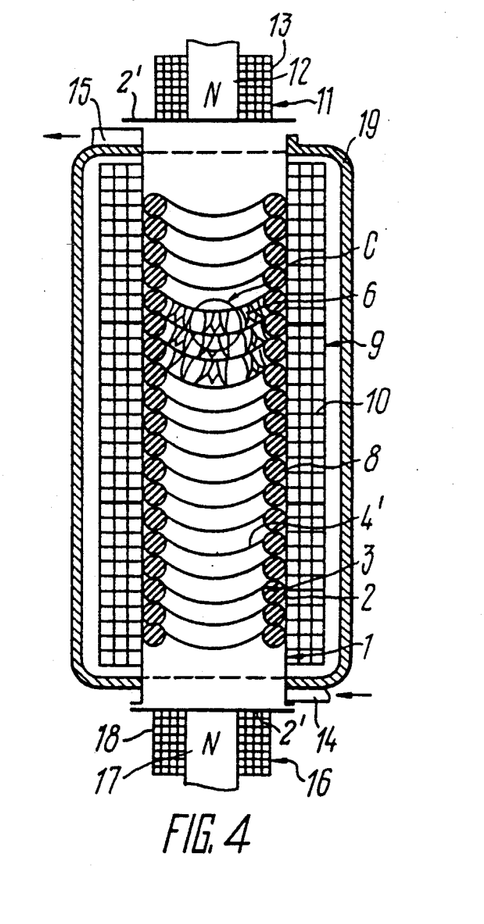
FIG. 4 is a longitudinal section of the general view illustrating an apparatus for separation of ferromagnetic materials from fluid media, comprising a ferromagnetic attachment in the form of a multitude of curvilinear plates.
Figure 5:
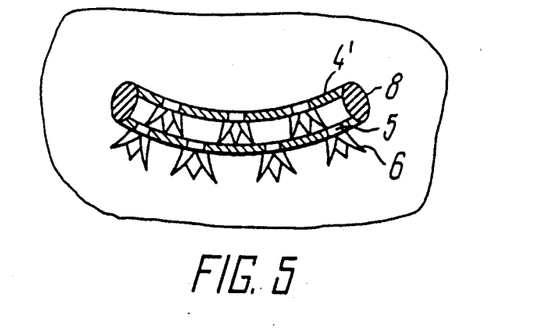
FIG. 5 is an enlarged detail C in FIG. 4 in which shaped projections in the form of pointed "petals" of one curvilinear plate are in contact with the surface of an adjacent plate, the position of plates corresponds to the purification mode.
Figure 6:
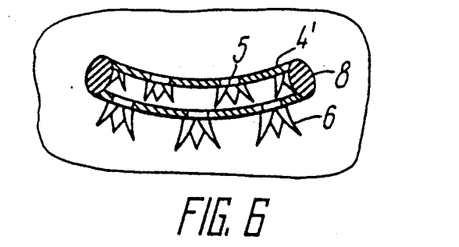
FIG. 6 is similar to FIG. 5, the position of plates corresponding to the apparatus regenerating process.

In contrast to the embodiment of FIGS. 1, 2, 3 an embodiment of the apparatus according to the invention, shown in FIGS. 4, 5, 6, comprises curvilinear elastic plates $4^1$ and a second additional magnetic field source 16 in the form of an electromagnet disposed outside the chamber 1 on the lower cover $2^1$. The magnetic field source 16 comprises a core 17 and an electric coil 18, and is arranged in much the same way as the magnetic field source 11. The plates $4^1$ are curvilinear in shape, have an identical curvature and are arranged uniformly at an equal distance from one another throughout the height of the chamber 1. In the direction of flow of the fluid medium being purified the shaped projections 6 of the plates 4$^1$ are provided with the additional openings 5$^1$ edged by the auxiliary "petals" 7 bent at an angle to the plane of the projection 6, the number of the main projections 6 being increased throughout the length of the chamber 1 from the inlet connection 14 towards the outlet connection 15 (for clarity the openings 5$^1$ and projections 7 are not shown in FIGS. 4, 5, 6, as they are identical in shape with the projections 7 and openings 5$^1$ of FIGS. 2, 3). To provide a closed magnetic circuit of the apparatus, the solenoid 10 is enclosed by a ferromagnetic shell 19 which allows the magnetic field environmental losses to be minimized. The presence of the electromagnet 16 ensures a required adjustment of the density of the plate stack of the attachment 3 by way of compressing and expanding the plates 4$^1$. The presence of the second additional magnetic field source 16 is most suitable in the case when thickness of the plate stack of the attachment 3 amounts to 1.0 and upward and also in the case when an intensive shaking of the plates 4$^1$ is required for removing, for example, high-magnetic impurities from the surface of the plates 4$^1$.

Referring to FIGS. 5, 6, there is shown the position of the plates 4$^1$ in the purification mode (FIG. 5) and in the regeneration mode (FIG. 6). Referring to FIG. 5, the shaped projections 6 in the form of the pointed "petals" of the upper plate 4$^1$ are in contact with the surface of the lower plate 4$^1$, thereby forming zones of the high-gradient magnetic field at the points where the impurities are precipitated. The effective regeneration takes place when the shaped projections 6 and the surface of the plates 4$^1$ (FIG. 6) are separated at the points of their contact under the action of the magnetic field sources 11, 16 and the elastic liners 8.

Figure 7:
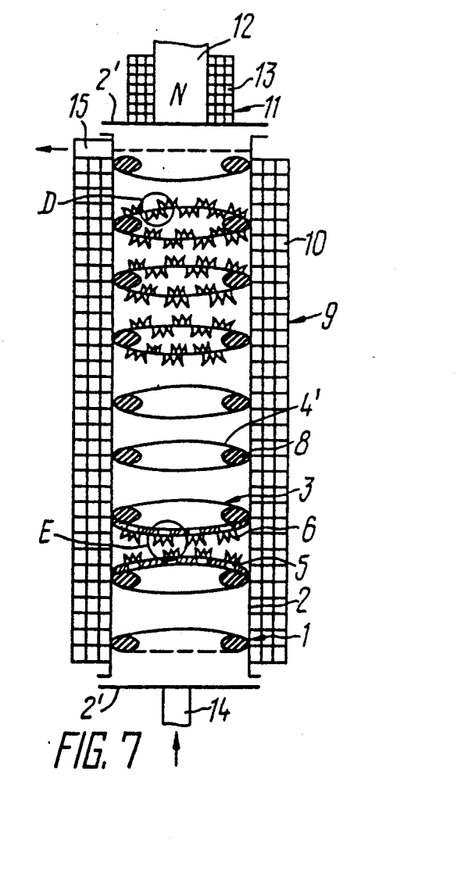
FIG. 7 is a longitudinal section of the general view illustrating an apparatus for separation of ferromagnetic materials from fluid media in which curvilinear plates are installed alternately: one concave, one convex and so forth.
Figure 8:
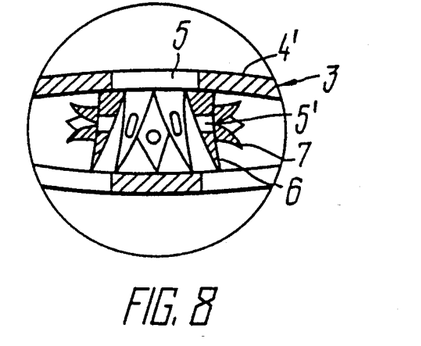
FIG. 8 is an enlarged detail D in FIG. 7 in which shaped projections of the upper plates in the working chamber in the form of pointed "petals" comprise additional openings edged by auxiliary pointed "petals"
Figure 9:
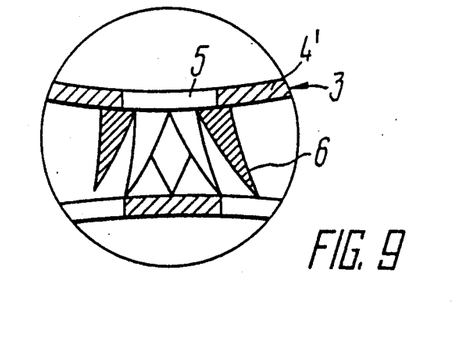
FIG. 9 is an enlarged detail E in FIG. 7 in which shaped projections of the lower plates in the working chamber in the form of pointed "petals" are not provided with additional openings.

With reference to FIGS. 7, 8, 9, there is shown an embodiment in which the curvilinear plates 4$^1$ are installed in the working chamber 1 alternately: one concave plate 4$^1$, one convex and the elastic liner 8 is placed therebetween. Such a relative arrangement of the curvilinear plates 4$^1$ featuring the elastic properties makes it possible to simply, from the technical standpoint, change in a wide range the density of the plate stack of the attachment 3, to increase or reduce the points of contact between the shaped projections 6 and the plates 4$^1$ and hence the number of zones of the nonuniform magnetic field. In the direction of flow of the medium being purified in the chamber 1, the number of the shaped projections 6 is increasing. For example, the shaped projections 6 in the lower layers of the attachment 3 do not contain the additional openings 5$^1$, while beginning with half of the height of the layer of the plate attachment 3 the shaped projections 6 are provided with additional openings 5$^1$ and consequently with the additional projections in the form of the pointed "petals" 7.

Figure 10:
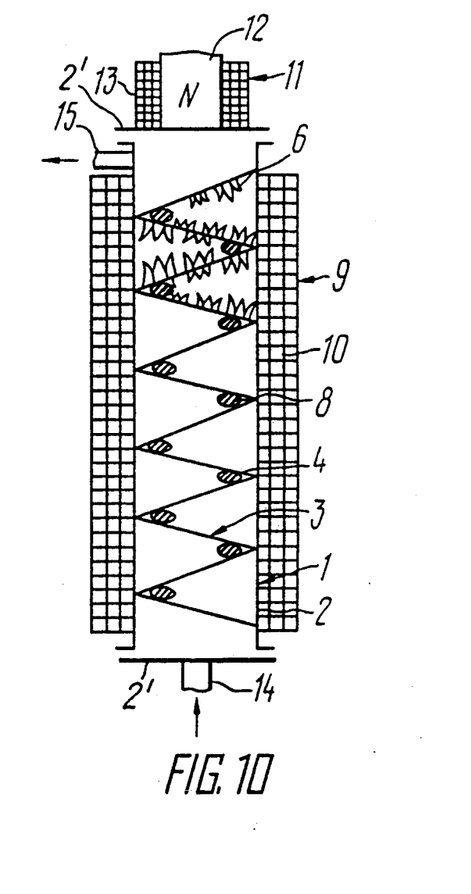
FIG. 10 is a longitudinal section of the general view of an apparatus for separation of ferromagnetic materials from fluid media, in which the plates form a zigzag ribbon along the center line of the working chamber.

In contrast to the embodiment of FIG. 1, an embodiment of the apparatus shown in FIG. 10 comprises the plates 4 with the shaped projections 6 connected with one another so that each preceding plate 4 is connected by its rear end with the front end of the subsequent plate 4 so as to form a zigzag ribbon from the plates 4 along the center line of the working chamber 1. The plate attachment 3 in the form of a zigzag ribbon ensures an effective separation of the plates 4 and loosening of the settled particles which aids in bringing the regeneration to a required degree, especially when strongly concentrated and greasy media are to be purified, for example, in purifying the circulating water which requires a moderately high density of the plate stack and reduced thickness of the plate layer of the attachment 3.

Figure 11:
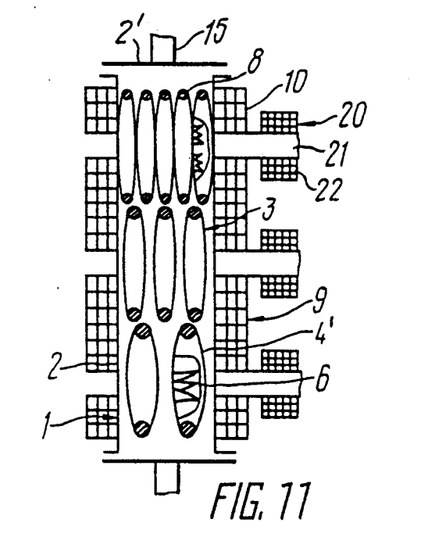
FIG. 11 is a longitudinal section of the general view of an apparatus for separation of ferromagnetic materials from fluid media, in which the plates are oriented by their plane along the center line of the working chamber and are arranged alternately: one concave, another convex and so forth.

Referring to FIG. 11, there is shown an embodiment according to the invention, in which the curvilinear plates 4$^1$ are installed alternately: one concave, one convex, the plates 4$^1$ being oriented by their plane along the center line of the working chamber 1. Separation and shaking of the plates 4$^1$ in the regeneration mode are accomplished by means of electromagnets 20 disposed on the side surface of the working chamber 1. The electromagnets 20, each of which comprises a core 21 and an electric coil 22, are distributed throughout the length of the working chamber 1 and can operate independently of one another. In this embodiment of the apparatus the solenoid 10 is made in the form of individual sections distributed throughout the length of the working chamber 1. The cores 21 of the electromagnets 20 are oriented at right angles to the plane of the plates 4$^1$, are arranged in the gaps between the sections of the solenoid 10, and their end faces are snug against the side surface of the chamber 1. The use of a pulsed mode for energizing and deenergizing the electromagnets 20 in the process of regeneration ensures an intermittent shaking of the plates 4$^1$ which leads to separation of the latter, loosening of settled particles and facilitates their removal.

Figure 12:
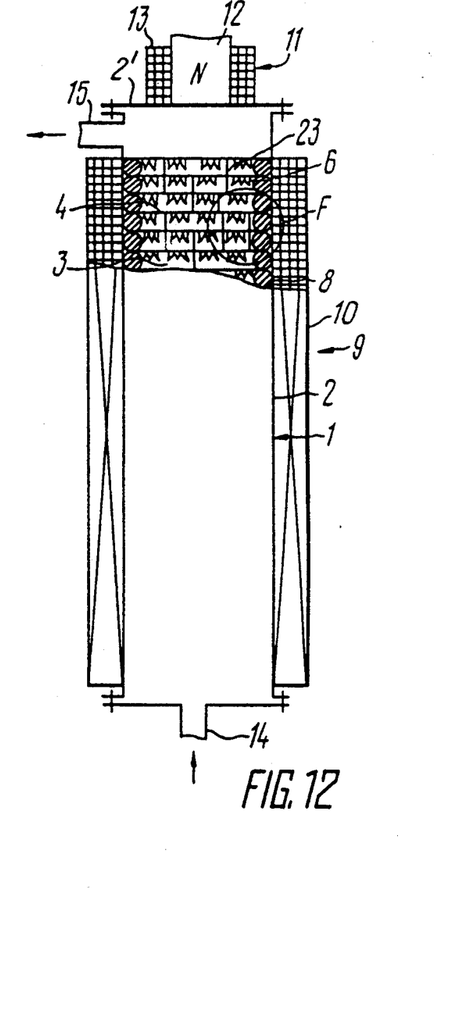
FIG. 12 is a longitudinal section of the general view of an apparatus for separation of ferromagnetic materials from fluid media, in which the plates are provided with additional shaped projections made in the form of bars.
Figure 13:
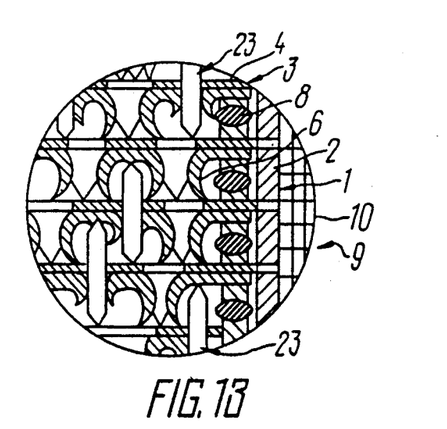
FIG. 13 is an enlarged detail F in FIG. 12.
Figure 14:
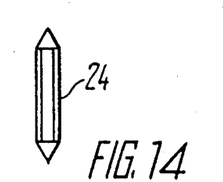
FIG. 14 is a general view of a bar with corrugated outside surface.
Figure 15:
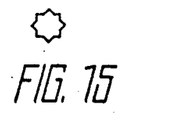
FIG. 15 is a top view of FIG. 14.
Figure 16:
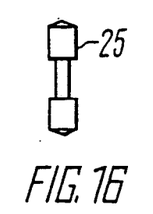
FIG. 16 is a general view of a bar with cylindrical pointed upper and lower portions and with a reduced diameter in the place of fastening to the plate.
Figure 17:
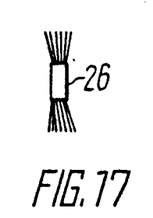
FIG. 17 is a general view of a bar made in the form of a bundle of elastic ferromagnetic filaments.
Figure 18:
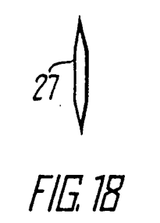
FIG. 18 is a general view of a bar with taper pointed upper and lower portions and with an enlarged section in the place of fastening to the plate.
Figure 19:
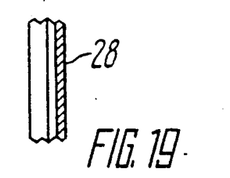
FIG. 19 is a general view of a bar made in the form of a tube with notches on the end faces.
Figure 20:
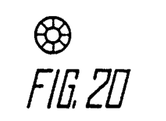
FIG. 20 is a top view of FIG. 19.
Figure 21:
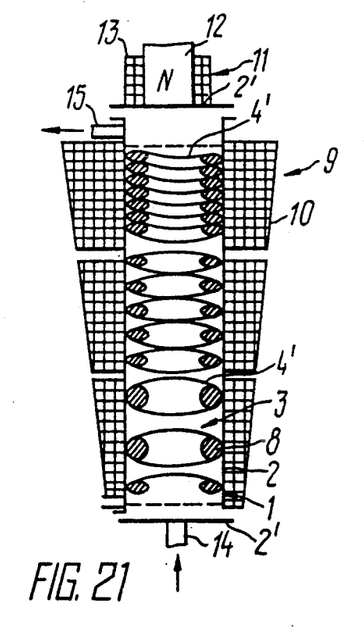
FIG. 21 is a longitudinal section of the general view of an apparatus for separation of ferromagnetic materials from fluid media, in which the plates have a compounded arrangement, part of the plates in the lower portion of the working chamber are arranged alternately: one concave, one convex and so forth, while in the upper portion of the chamber all the plates are concave.

An embodiment of the apparatus shown in FIGS. 12, 13 differs from the embodiment of FIG. 1 in that the plates 4 are provided with additional shaped projections 23 made in the form of bars having the length equal to the distance between every two nearest odd plates 4 rigidly secured in the even plates 4. The ferromagnetic bars 23 may be made in the form of pointed solid bars 24 (FIGS. 14, 15) with corrugations on the outside surface or in the form of pointed solid bars 25 (FIG. 16) of variable cross-section narrowed at the central portion and widened at the ends, or in the form of a bundle of thin elastic filaments 26 (FIG. 17), or in the form of needle-shaped bars 27 (FIG. 18), or in the form of tubes 28 (FIGS. 19, 20) with notches on the end faces.

When the apparatus is used for purifying strongly concentrated media mainly containing medium size and coarse-dispersion impurities, the bars 23 have a length which is less than the distance between the nearest odd plates 4 (FIGS. 12, 13). It is advantageous and useful to employ the compounded plate attachment 3 with the bars 23 due to the following facts. The maximum density of the openings 5 on the surface of the plates 4 without the bars 23 may be achieved when the spacing between the adjacent openings 5 will be reduced to a minimum which depends on the thickness and material of the plates 4, and conditions of punching the openings 5 in the plates 4. Additional openings of a diameter smaller than that of the main openings 5 may be punched in a land formed between the openings 5. As a result, there are formed "petals" of a smaller size and consequently the contact between the plates 4 is formed only at the expense of the projections 6 of the main (larger) openings 5. In a proposed embodiment of the apparatus shown in FIGS. 12, 13 the number of contact points between the plates 4 of the attachment 3 is increased at the expense of the additional contact points between the bars 23 and the plates 4, i.e. a number of effective zones of the magnetic precipitation of impurities are increased.

In addition, insertion of the bars 23 in the plates 4 increases the density of the plate stack of the attachment 3 on the whole, i.e. the concentration of the ferromagnetic material per unit volume of the attachment 3 increases which leads, at one and the same intensity of the external field, to increase in the magnetic permeability ($\mu$) of the attachment 3 and consequently to increase in the field induction and in the action of the magnetic field forces on the impurities being precipitated, which finally improves the efficiency of the purification process which is especially advantageous when purifying the media comprising high-dispersion impurities, for example, thermal and atomic power plant sewage.

To eliminate the nonuniformity in distribution of the magnetic field (in pole and central zones when electromagnets are used as a magnetizing system, as well as in wall and central zones when solenoids are used for the same purpose), the bars 23 are made of materials possessing different magnetic properties, i.e. such that compensate for variations of the magnetic field when it is distributed throughout the volume of the attachment 3. For example, in the zones of the attachment 3 with a high magnetic field intensity the bars 23 are made of low-carbon magnetically soft steel, while in the zones with a low magnetic field intensity the bars 23 are made of a material with the magnetic permeability amounting to 5000-50,000. For forming the zones with a nonuniform magnetic field and for increasing the magnetic permeability, it is desirable to make the end portions of the solid bars 25 (FIG. 16) of increased thickness. Local zones of a high-gradient magnetic field occur in the places where the cross-section of the solid bars 25 is changed which contributes to raising the degree of the magnetic purification. For this purpose, corrugations are made on the surface of the solid bars 24 (FIGS. 14, 15) and the end faces of the tubular bars 28 (FIGS. 19, 20) are provided with notches at the pointed ends of which are set up the zones of a nonuniform magnetic field. The needle-shaped bar 27 (FIG. 18) when brought in contact with the surface of the plate 4 sets up a zone of the highly nonuniform magnetic field which ensures precipitation of slightly magnetic impurities. In addition, the needle-shaped bars 27 practically offer no resistance to the flow of the medium being purified.

Provision of the bars 23 which are rigidly secured in the even plates 4 and in one case have the contact through their ends with the odd plates 4 and have no such contact in the other case is also dictated by a need for equalizing the conditions of the precipitation process throughout the volume of the attachment 3. For example, the bars 23 are made shorter in length to prevent them from coming in contact with the adjacent nearest plates 4 and are installed in those zones of the attachment 3, wherein the magnetic field has the maximum intensity, and in the other case the bars 23 are made longer to provide the contact with the plates 4 and are installed in those zones of the attachment 3, wherein the magnetic field has a reduced intensity.

Provision of the tubular bars 28 (FIGS. 19, 20) with the notches provided at the end faces thereof increases the surface of elements of the attachment 3 coming in contact with the medium being purified and the number of sharp edges (magnetic field concentrators on which a high-gradient magnetic field is induced). Openings in the tubular bars 28 also serve for reducing the rate of filtration, i.e. for extending the duration of the magnetic action on the impurities being precipitated due to increase in the free area of the attachment 3.

For purifying the fluid media containing high-dispersion slightly magnetic impurities the intensity of the external field in the direction of flow of the medium being purified is set in the increasing order of magnitude, which is ensured for example, by increase in the number of turns of the coil of the solenoid 10 in the same direction and by increase in the density of the stack of the plates $4^1$ of the attachment 3 in the same direction.

Figure 22:
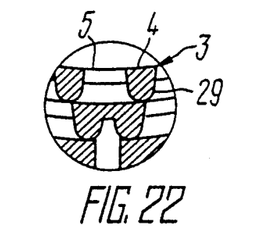
FIG. 22 is a longitudinal section illustrating an alternative embodiment of ring-like projections having a variable cross-section increasing in magnitude from the top of the projection towards its base.
Figure 23:
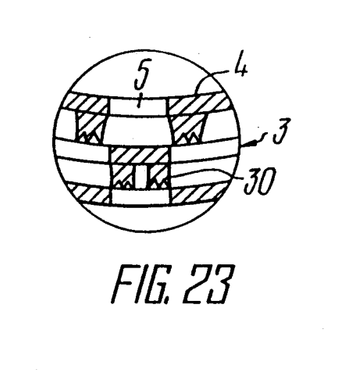
FIG. 23 is a longitudinal section illustrating an alternative embodiment of ring-like projections of variable cross-section provided with notches at the end faces thereof.
Figure 24:
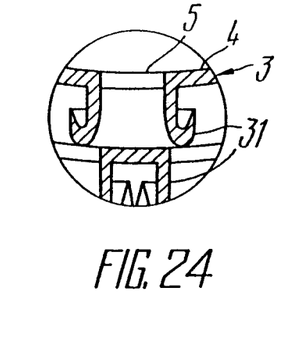
FIG. 24 is a longitudinal section illustrating an embodiment of shaped projections arranged along the circumference of openings in the form of collars bent outwardly relative to the center of the opening.

In this case coarse foreign particles are precipitated from the medium being purified on the projections 6 which have no contact with the plates $4^1$, while high-dispertion impurities are precipitated in places where the projections 6 come in contact with the surface of the plates $4^1$. For enlarging the zones of the high-gradient magnetic field, the use is made of the plates 4 with the shaped projections 6 of different configuration, for example, with the ring-like projections 29 (FIG. 22) having a variable cross-section increasing in magnitude from the top of the projection 29 towards its base and contacting the adjacent plate along the circumference. The difference of the shaped projections 30 shown in FIG. 23 resides in that the end face surfaces thereof are provided with notches forming several circles along which the projections 30 come in contact with the adjacent plates 4, thereby providing a substantial number of zones of the nonuniform magnetic field. The projections 31 shown in FIG. 24 are made along the circumference of the openings 5 in the form of the collars bent outwardly relative to the center of the openings 5. Such a shape of the projection is adaptable to stream-lined production and the plates 4 with the projections 31 may advantageously be used for purifying heavily contaminated media containing coarse-dispersed impurities. The projections of FIG. 24 in the form of the collars made along the circumference of the openings when brought in contact with the plates 4 provide the points of contact and also provide zones of the nonuniform magnetic field in the vicinity of the sharp edges of the collars bent outwardly where the coarse dispersed and high-magnetic impurities are precipitated.

Figure 25:
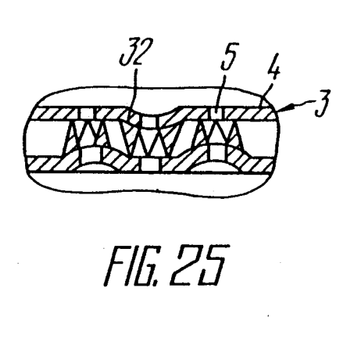
FIG. 25 is a longitudinal section illustrating the plates in which the height of projections is less than the distance between two adjacent plates, and the plates proper are provided with convex or concave portions arranged in places where the openings are arranged.
Figure 26:
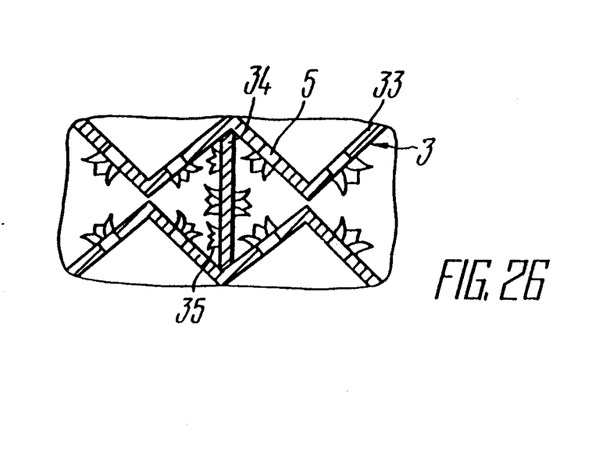
FIG. 26 is a longitudinal section illustrating plates of a wave-like shape.

For increasing the density of the plate stack and magnetic permeability of the attachment 3, the height of the shaped projections 32 (FIG. 25) of the plates 4 is smaller than the distance between the two adjacent plates 4 and the plates 4 are made shaped and provided in places where the openings 5 are located with convex or concave portions of such a depth in relation to the plane of the plate 4 that in combination with the height of the shaped projection 32 the contact of the latter with the surface of the subsequent plate 4 is ensured. In this case the length of the path of the fluid medium flowing through the attachment 3 may also be extended by locating the openings 5 in a staggered order on the plates 4 disposed in succession. For purifying the media containing high-magnetic impurities in large quantities the path of flow of the media through the attachment 3 may be extended by maintaining the zones of the nonuniform magnetic field with the use of the wave-like (corrugated) plates 33 (FIG. 26) having therebetween additional plate partitions 34 with projections 35.

When the solenoids 10 (FIG. 27) are used as the magnetizing system 9 in the apparatus of a high production capacity, the low induction of the magnetic field in the solenoid axial zone comprising 20-30% by volume may be compensated by increasing the density in arrangement of the openings 5 with the shaped projections on each plate in this zone by 20-30% in comparison with the peripheral zone of the solenoid. When the magnetizing system 9 (FIG. 28) is represented by a two-pole electromagnet 36 the poles of which bear against the side surface of the working chamber 1, wherein the direction of flow of the medium being purified is oriented transverse to the vector of the magnetic field, the openings 5 with the shaped projections are distributed on each plate 4 so that their number in the zone of the plate 4 most distant from the poles of the electromagnet 36 is increased by 20-30% in comparison with the zones being adjacent to the poles.

Figure 29:
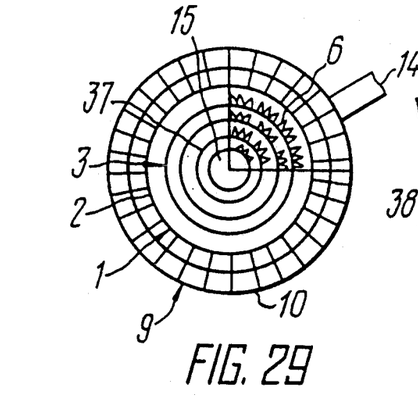
FIG. 29 is a cross-section illustrating an embodiment of an apparatus with a ferromagnetic attachment comprising plates made in the form of concentric cylindrical surfaces coaxial with the working chamber.
Figure 30:
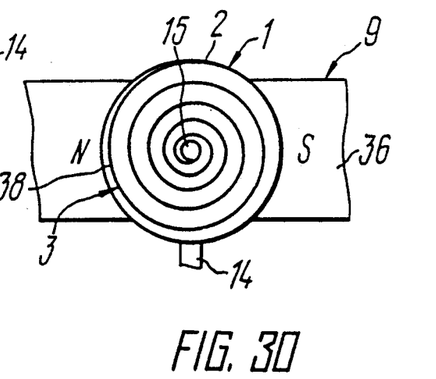
FIG. 30 is a cross-section illustrating an apparatus with a ferromagnetic attachment comprising plates made in the form of cylindrical surfaces whose cross-section forms a spiral.

The ferromagnetic attachment 3 in an embodiment of the apparatus shown in FIG. 29 is made up of plates 37 in the form of coaxial cylindrical surfaces, with the distance between the plates 37 decreasing in magnitude from the inlet connection 14 disposed on the side surface of the chamber 1 at a height equal to half the height of the chamber 1 towards the outlet connections 15 disposed on the end faces of the chamber 1. In an embodiment of the apparatus shown in FIG. 30 the attachment 3 comprises plates 38 made in the form of cylindrical surfaces which in the cross-section form a spiral, with the distance between adjacent turns of the spiral decreasing in magnitude from the inlet connection 14 towards the outlet connection 15 disposed in much the same way as was stated above in describing an alternative embodiment of FIG. 29.

For minimizing magnetic flux losses to the environment, the working chambers 1 (FIG. 31) of the apparatus according to the invention are combined by two chambers 1 together with the electromagnets 36 into modules 39 to form a complex comprising, for example, three self-contained and independently operating modules 39. For example, the two modules 39 are operating in the purification mode and one in the regeneration mode.

Figure 32:
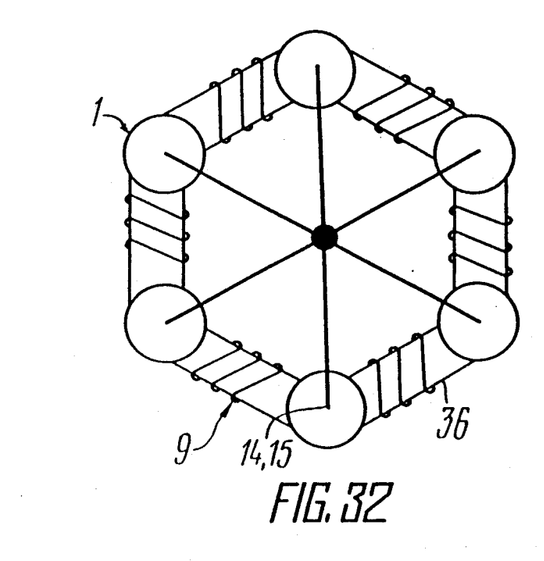
FIG. 32 is a diagrammatical view illustrating an apparatus for separation of ferromagnetic materials from fluid media, comprising six working chambers and in which the electromagnets by their side surface are snug against the chambers, thereby forming a toroidal magnetic circuit.

The working chambers 1 (FIG. 32) may also be connected with the electromagnets 36, using another scheme to form, for example, from the six chambers 1 a ring-shaped circuit, wherein the electromagnets 36 by the face portion of their cores bear against the housings of the working chambers 1.

The apparatus for separation of ferromagnetic materials from the fluid media operates in the following manner.

A liquid or a gaseous fluid medium enters through the inlet connection 14 (FIG. 1) the working chamber 1 occupied by the ferromagnetic attachment 3 made in the form of a multitude of the plates 4 having the through openings 5 provided along the circumference with the shaped projections 6. Under the action of the magnetic field set up by the magnetizing system 9, made in the form of the multilayer solenoid 10, the plate ferromagnetic attachment 3 is magnetized and zones of the high-gradient magnetic field are set up at the points and lines of contact of the shaped projections 6 with the plates 4 where impurities are precipitated from the fluid medium being purified under the action of the magnetic force F=H·grad H, where F is the magnetic strength, H is the magnetic field intensity, and grad H is the gradient of this magnetic field.

Figure 27:
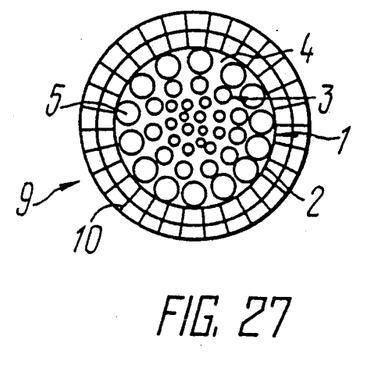
FIG. 27 is a cross-section illustrating an embodiment of an apparatus with a magnetizing system in the form of a solenoid and with a ferromagnetic attachment made up of plates in the form of flat disks.
Figure 28:
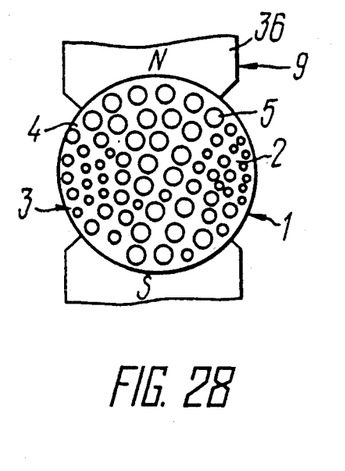
FIG. 28 is a cross-section illustrating an embodiment of an apparatus with a magnetizing system made in the form of electromagnets the poles of which bear against the side surface of the working chamber in which the flow of a fluid medium being purified is oriented transverse to the magnetic field induction vector.

By changing the number of the shaped projections 6 and the auxiliary pointed "petals" 7, the degree of fluid medium purification can be brought to a required design value. By way of forming the additional auxiliary pointed "petals" 7, the number of points and lines of contact can be additionally increased by 3-4 times. The number of zones of the high-gradient magnetic field will be increased respectively. After passing through the attachment 3 the fluid medium cleaned of the impurities is discharged through the connection 15. Depending on sizes of foreign particles, their magnetic properties and viscosity of the medium being purified, the number of the shaped projections in the proposed apparatus, the distance between the plates 4, the height of the shaped projections 6 and their configuration are varied in a wide range in the direction of flow of the purified medium from the inlet connection 14 towards the outlet connection 15. For example, the density of the plate stack of the attachment is varied from 0.05 to 0.6 and upward. Besides, sizes of the openings 5, the shaped projections 6 are set in the apparatus variable not only throughout the height of the working chamber 1 but also throughout the plane of the separate plate 4 (FIGS. 27, 28).

For example, for purifying the fluid media mainly containing slightly magnetic and high-dispersion impurities, it is advantageous to use the embodiments of the apparatus shown in FIGS. 1, 2, 3, 12 featuring a greater number of the shaped projections 6 per unit volume of the attachment 3. In this case, it is recommended to change the density of the plate stack of the attachment 3 from 0.4 to 0.6. As a result, a mean magnetic field induction in the attachment 3 will amount to 1.2-1.6 T. For purifying the fluid media mainly containing high-magnetic and coarse-dispersed impurities, it is expedient to use the embodiments of the apparatus shown in FIGS. 7, 8, 9, 10, 11, 21. In this case, it is desirable to change the density of the plate stack of the attachment 3 from 0.1 to 0.3. A mean magnetic field induction in the attachment 3 amounts to 0.4-0.7 T.

When purifying viscous media a need arises for effective shaking and vibrations to provide separation of the plates 4. Therefore, it is preferred to use the embodiments of the apparatus with the curvilinear elastic plates $4^1$ and with the plates 4 connected so as to form a zigzag ribbon (FIGS. 4, 7, 10, 11, 21).

Figure 31:
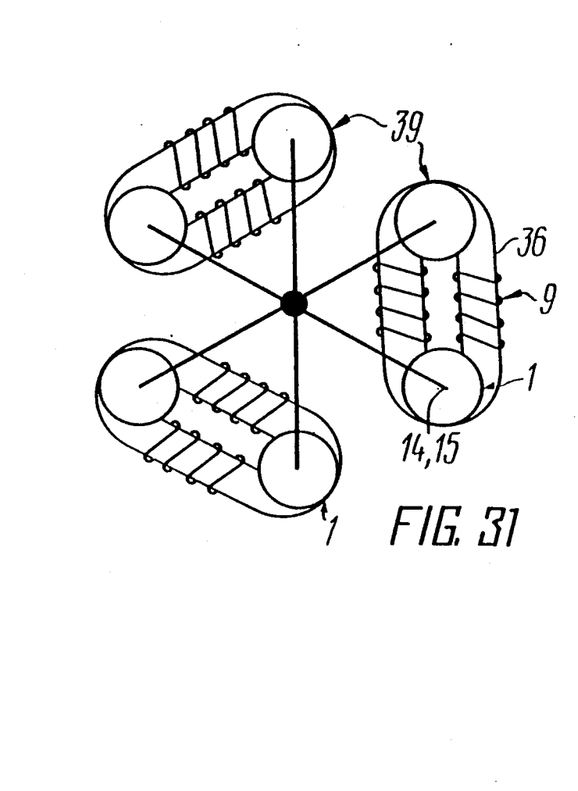
FIG. 31 is a diagrammatical view illustrating an apparatus for separation of ferromagnetic materials from fluid media, comprising six working chambers and in which the electromagnets by their side surface are snug against the working chambers, thereby forming independent modules.

For regenerating the attachment 3, the magnetizing system 9 is deenergized and supply of the medium being purified is directed to the reserve working chambers 1 (the modules 39 of FIG. 31). The additional magnetic field sources 11, 16, 20 on the working chambers 1 being regenerated are periodically energized and deenergized in a pulsed mode. Under the action of a short-time strong magnetic field the plates 4 are attracted to the poles of the magnetic field sources 11, 16, 20 and after the coils 13, 18, 22 are deenergized the plates 4 under the action of elastic forces and gravity are returned in the original position. The energizing and deenergizing operations should be repeated for a number of times. As a result, the projections 6 are separated from the adjacent plates 4 at the points and lines of their contact and the sediment of impurities is loosened. Elastic deformation of the plates 4 reduces the residual magnetization thereof, the magnitude of which may amount to a value commensurable with the working induction of the field. Compressed air or water-air mixture is delivered through the connection 15 for washing out the loosened sediment of impurities into a sewerage system.

EXAMPLE 1

Condensates of thermal and atomic power plants containing impurities of a relatively small concentration amounting to 20-200 μg/kg (at a required degree of purification of 10 μg/kg) were purified. In this case the range (size) of impurities varies from 0.01 to 5 μm and the impurities have different magnetic properties. Tests have proved that the optimum rate of filtration of such condensates is 150-300 m/h and the length of the attachment 3 was taken equal to 0.8-1.2 m. For purifying such comparatively "clean" condensates, it was necessary to set up the magnetic field intensity at contact points amounting to 400-800 kA/m. To provide equal and uniform clogging of the attachment 3 with impurities throughout the entire length of the attachment 3, a variable density of the plate stack in the attachment and a variable number of zones of the high-gradient magnetic field were set up through out the length of the attachment 3, i.e. the density of the plate stack and the number of zones of the high-gradient magnetic field were increasing in the direction of flow of the medium being purified.

In this case the stack of plates of the attachment 3 was arbitrarily divided into three-four zones throughout the height of the attachment 3. In the first zone in the direction of the fluid medium flow the density of the stack was set equal to 0.3, in the second zone to 0.4, in the third zone to 0.5, in the fourth zone to 0.6. Increase in the density of the plate stack in excess of 0.6 is associated with increase in the rate of the fluid medium flow in porous channels (the role of hydrodynamics is growing in importance) which reduces the effect of increasing the density of the plate stack and consequently the effect of the magnetic permeability of the whole attachment 3. Depending on the design density of the plate stack, the openings 5 (circular or in the form of triangles or polyhedrons) are punched in the plates 4. In the proposed case the openings were punched of such a form that the shaped projections 6 were pointed and had different length. For example, the opening 5 was punched with a piercing die being a penta- or hexahedron in the cross-section, or rings with serrations variable in size were spot welded around the opening 5. In the third and the fourth zones the additional openings $5^1$ with the "petals" 7 were made in the shaped projections 6 of the plates 4. In this case coarse-dispersed impurities were precipitated in the lower zone of the attachment 3 and the precipitation of such impurities required that the magnetic field intensity should be as high as that in the first zone; impurities of a medium fraction size were precipitated in the middle zone of the attachment 3 and the impurities of the finest size, fractions of micron, were precipitated in the upper zone. At the same time the whole volume of the attachment 3 was approximately uniformly clogged with impurities which in its turn gave rise to extension of the filtration cycle (i.e. to the extension of the time period between the successive regeneration processes) and to reduction of the downtime caused by regeneration.

For regenerating the attachment 3 the magnetic field was switched off and under the action of the elastic liners 8 the plates 4 were separated. When the electromagnets 11 were energized and deenergized in a pulsed mode the plates 4 were moved up and down, thereby loosening the precipitated impurities and a water-air medium was delivered at the same time through the connection 15 for washing out the precipitated particles in the sewerage system.

EXAMPLE 2

For purifying the circulating water of a metallurgical production rolling mill, in which the concentration of impurities amounts to 6000-120,000 μg/kg the required density of the plate stack of the attachment 3 is less than that used in the foregoing example and it was selected in a range of 0.1 to 0.35, the rate of the medium flow was set equal to 400-1200 m/h and the length of the attachment 3 was taken equal to 0.2-0.4 m. Proceeding from these data, the number of the shaped projections 6 in the plates 4 in the zones of the attachment 3 were calculated throughout the volume of the working chamber 1. And in the direction of flow of the medium being purified the working chamber 1 was provided with the plates 4 having the shaped projections 6 of one form, for example, the plates 4 with the projections 30 in the form of rings (FIG. 22) were installed in the lower portion, the plates 4 with the projections 6 in the form of the collars 31 (FIG. 24) were installed in the middle portion and the plates 4 with the pointed fan-like projections 32 (FIG. 25) were installed in the upper portion. The filtration cycle and the absorption capacity was increased by 30-40% and respectively the efficiency of purification is increased by 30-40%.

Apparatus for separation of ferromagnetic materials from fluid media according to the present invention may be used in chemical, metallurgical, machine-building industries, heat power engineering and also for purification of sewage and gases, especially for fine purification, for example, of condensates, circulating water, oil, ammonia, alkalis, steam, gas and other fluid media from products of equipment corrosion, products of wear of machine and mechanism parts, and dispersed scale.

What we claim is:

1. An apparatus for separation of ferromagnetic materials from fluid media, comprising:

a working chamber internally accommodating a ferromagnetic attachment comprising a multitude of parallel stacked plates with through openings, and elastic liners disposed between the adjacent stacked plates, said through openings having a circumference, said circumference being provided with shaped projections oriented at an angle to a plane of the plates, the shaped projections having ends;

a magnetizing system for magnetization of the ferromagnetic attachment;

an inlet means for delivery of a fluid medium in the working chamber for purification;

an outlet means for receiving purified fluid medium after passing through the attachment; and means for varying the distance between adjacent said stacked plates, between an open position and a closed position, whereby the density of the plates in the stacking direction may be varied, said means for varying the distance between the plates comprising at least one additional magnetic field source disposed outside the working chamber so that a vector of a magnetic field of said source is oriented along a center line of the working chamber.

2. An apparatus, as claimed in claim 1, wherein the plates are made of a material possessing elastic properties and have an identical curvilinear shape.

3. An apparatus, as claimed in claim 1 or 2, wherein the shaped projections comprise main pointed petals extending from the circumference of said through openings, said main pointed petals including additional openings edged by auxiliary pointed petals bent at an angle to a plane of a main petal, the number of the main petals provided with the additional openings being increased in a direction of flow of the fluid media from the inlet means towards the outlet means.

4. An apparatus, as claimed in claim 2, wherein the curvilinear plates are installed in the working chamber alternately one concave, one convex and so forth, and said elastic liners are disposed between the concave faces of the plates.

5. An apparatus, as claimed in claim 1, wherein the distance between two adjacent plates decreases in magnitude in a direction from the inlet means towards the outlet means.

6. An apparatus, as claimed in claim 5, wherein a height of the shaped projections is equal to the distance between two adjacent plates when said stack of plates is in said closed position, the ends of the projections of each preceding plate being in contact with the surface of each subsequent plate when said stack of plates is in said closed position.

7. An apparatus, as claimed in claim 1, wherein the size of the openings in the plates decreases in magnitude in a direction from the inlet means towards the outlet means.

8. An apparatus, as claimed in claim 1 or 2, wherein the shaped projections have a ring-like form of a variable cross-section increasing in magnitude from a top of the projection towards a base of the projection.

9. An apparatus, as claimed in claim 8, wherein an end face surface of the ring-like projection is provided with notches.

10. An apparatus, as claimed in claim 1, wherein the shaped projections are made along a circumference of the openings in the form of collars bent outwardly in relation to a center of the opening.

11. An apparatus, as claimed in claim 1, wherein a height of the shaped projections is smaller than the distance between two adjacent plates when said stack of plates is in said closed position, and the plates proper are provided, in places where the openings are arranged, with convex or concave portions having such a depth on even and odd plates in relation to a plane of the plate that, in combination with the height of the shaped projection, contact of the shaped projection with the surface of an adjacent plate is ensured when said stack of plates is in said closed position.

12. An apparatus, as claimed in claim 1 or 2, wherein the plates are provided with additional shaped projections made in the form of bars.

13. An apparatus, as claimed in claim 12, wherein the bars are rigidly secured in the even plates and have a length equal to a distance between each two adjacent odd plates when said stack of plates is in said closed position.

14. An apparatus, as claimed in claim 12, wherein the bars have a length smaller than a distance between each two adjacent odd plates when said stack of plates is in said closed position.

15. An apparatus, as claimed in claim 12, wherein the bars comprise a bundle of elastic ferromagnetic filaments.

16. An apparatus, as claimed in claim 12, wherein the end portions of the bars are thicker in cross-section than the center portions of the bars.

17. An apparatus, as claimed in claim 12, wherein the bars are made in the form of tubes.

18. An apparatus, as claimed in claim 1, wherein the magnetizing system comprises a solenoid and the plates are made in the form of flat disks and the shaped projections in each plate increase in number in a direction from a periphery towards a center of the disk.

19. An apparatus, as claimed in claim 1, wherein the magnetizing system comprises a two-pole electromagnet having poles which bear against the surface of the working chamber wherein a direction of flow of the medium being purified is oriented transverse to a vector of magnetic field induction, the shaped projections being distributed on the plates so that their number in the zone of each plate most distant from the electromagnet poles is increased.

20. An apparatus, as claimed in claim 1, wherein said through-openings, said projections, and relative spacing between said stacked plates are of varied pre-determined size throughout the working chamber depending on magnetic properties, size and concentration of foreign particles contained in the fluid media being purified.

21. An apparatus, for separation of ferromagnetic materials from fluid media, comprising:
a working chamber internally accommodating a ferromagnetic attachment comprising a multitude of stacked plates with through openings, said through openings having a circumference, said circumference being provided with shaped projections oriented at an angle to a plane of each plate, the shaped projections having ends;
a magnetizing system for magnetization of the ferromagnetic attachment;
an inlet means for delivery of a fluid medium in the working chamber for purification;
an outlet means for receiving purified fluid medium after passing through the attachment; and means for varying the distance between adjacent stacked plates, whereby the density of the plates in the stacking direction may be varied, each plate of the ferromagnetic attachment having a rear end and a front end, and each preceding plate being connected by the rear end with the front end of each subsequent plate so that a zigzag ribbon is made up of the plates along the center line of the working chamber.

22. An apparatus for separation of ferromagnetic materials from fluid media, comprising:
a working chamber internally accommodating a ferromagnetic attachment comprising a multitude of concentric cylindrical surfaces coaxial with the working chamber and having through openings, said through openings having a circumference, said circumference being provided with shaped projections oriented at an angle to a plane of the plates, the shaped projections having ends;
a magnetizing system for magnetization of the ferromagnetic attachment;
an inlet means for delivery of a fluid medium in the working chamber for purification, said inlet means being located adjacent the outer most cylindrical surface; and
an outlet means for receiving purified fluid medium after passing through the attachment, said outlet means being located within the inner most cylindrical surface, a distance between adjacent cylindrical surfaces decreasing in magnitude in a direction from the inlet means towards the outlet means.

23. An apparatus for separation of ferromagnetic materials from fluid media, comprising:
a working chamber internally accommodating a ferromagnetic attachment comprising a spiral cylindrical surface with through openings, said through openings having a circumference, said circumference being provided with shaped projections oriented at an angle to a plane of the spiral surface, the shaped projections having ends;

a magnetizing system for magnetization of the ferromagnetic attachment;

an inlet means for delivery of a fluid medium in the working chamber for purification, said inlet means being located adjacent the outer most spiral turn of the spiral cylindrical surface; and an outlet means for receiving purified fluid medium after passing through the attachment, said outlet means being located within the innermost spiral turn of the cylindrical spiral surface, a distance between adjacent spiral turns decreasing in magnitude in a direction from the inlet means towards the outlet means.

* * * * *